(No Model.)
B. WRIGHT.
PUMP.
No. 485,250. Patented Nov. 1, 1892.
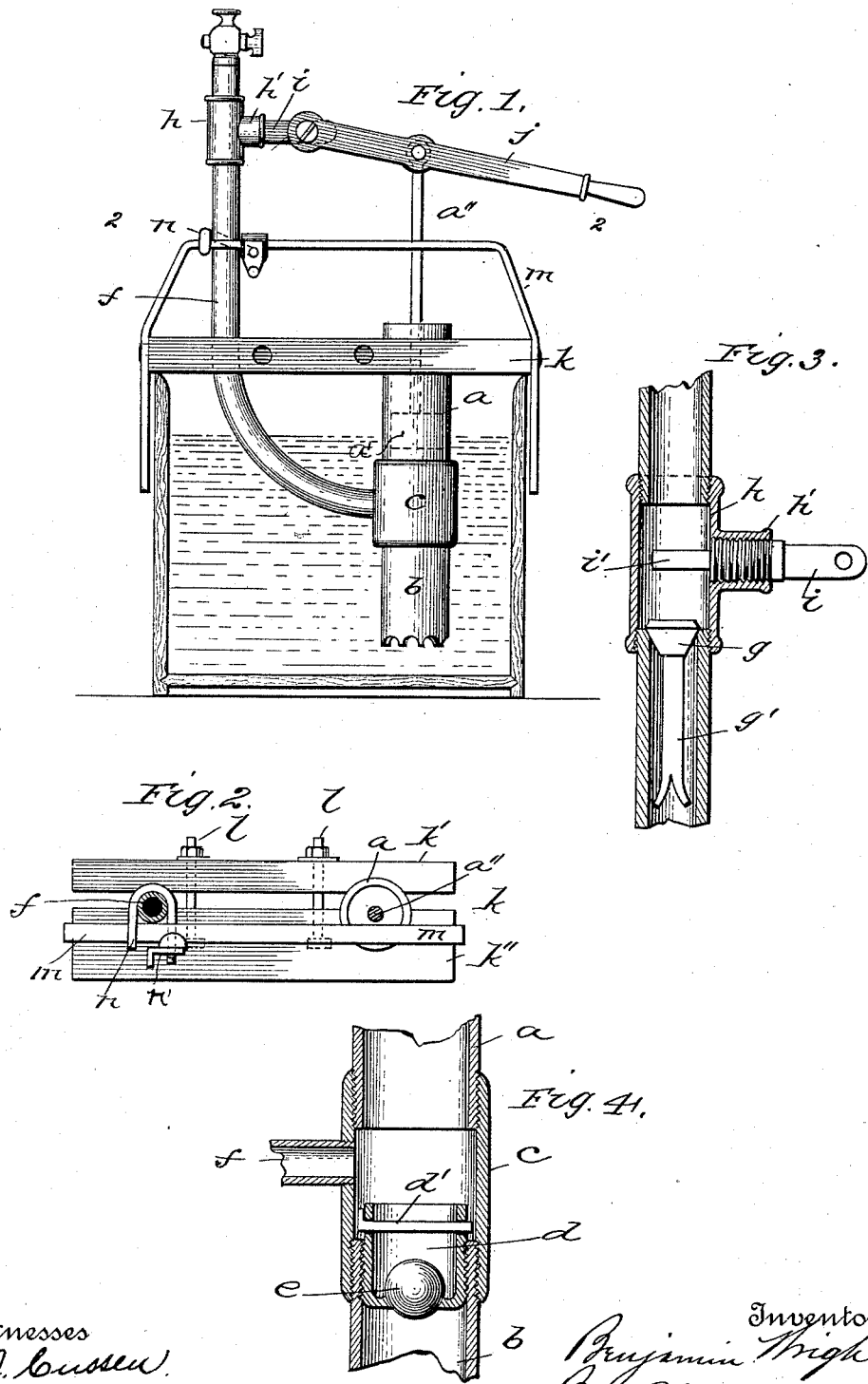
Witnesses
E. J. Cussen.
W. Harvey Muzzy.
Inventor
Benjamin Wright
By Alexander & Davis
his Attorneys

UNITED STATES PATENT OFFICE.

BENJAMIN WRIGHT, OF HUDSON, MICHIGAN.

PUMP.

SPECIFICATION forming part of Letters Patent No. 485,250, dated November 1, 1892.

Application filed July 2, 1892. Serial No. 438,848. (No model.)

*To all whom it may concern:*

Be it known that I, BENJAMIN WRIGHT, a citizen of the United States, residing at Hudson, in the county of Lenawee and State of Michigan, have invented certain new and useful Improvements in Pumps, of which the following is a specification, reference being had therein to the accompanying drawings.

This invention relates to a new and improved portable pump; and it has for its object to provide a pump of simple construction which may be readily placed over a receptacle, its lower end projecting into said receptacle, and which may be readily operated while in said position.

The invention consists in the novel combination and arrangement of parts hereinafter described, and particularly pointed out in the claims appended.

In the drawings, Figure 1 is a side elevation of my pump shown supported upon a receptacle, which latter is shown in sectional view. Fig. 2 is a horizontal sectional view taken on the line 2 2 of Fig. 1, and Figs. 3 and 4 are detail sectional views of the valves.

In the drawings, $a$ designates the open-ended pump-cylinder, in which the solid piston $a'$ works, and to the lower end of the cylinder is secured, preferably by screw-threads, a cylindrical casing or coupling $c$. This casing $c$ is larger in diameter than the pump-cylinder and has secured within its lower end the upper end of the inlet-pipe $b$, in which pipe the inlet-valve is located. This inlet-valve consists of a cup-shaped receptacle $d$, open at its upper end and provided with a circular opening in its lower end, said opening adapted to be closed automatically by a ball $e$. This cup $d$ is screwed or otherwise removably secured within the upper end of the inlet-pipe $b$, its upper edge projecting slightly above the upper edge of said pipe $b$. A pin $d'$ is passed loosely through perforations in the projecting upper edge of said cup $d$ and extends across said cup and prevents the displacement of the ball of the valve, and, as is clearly shown in Fig. 4 of the drawings, said pin is prevented from being displaced or removed by the wall of the cylindrical casing $c$ when the inlet-pipe $b$ is secured within the lower end of said casing.

It will be seen from the foregoing that the ball-valve and its seat may be removed from the pump-cylinder when desired by simply unscrewing pipe $b$.

Projecting into the casing $c$ through its side is the lower end of an upwardly-extending discharge-pipe $f$. The upper end of this discharge-pipe is downwardly and inwardly beveled, as shown in Fig. 3, and forms the seat for the outlet-valve $g$. This valve may be of any suitable construction and is shown with a downwardly-extending stem $g'$.

A valve-casing $h$ is screwed over the upper end of the discharge-pipe, and the discharge-nozzle is secured to the upper end of this valve-casing. The casing $h$ is provided with a rearwardly-extending hollow projection $h'$, and secured within this projection is a rearwardly-extending bar $i$, on the rear end of which is pivoted the operating-lever $j$, to which the piston-rod $a''$ is connected. A projection $i'$ is formed on the forward end of the bar $i$ and projects within the valve-chamber $h$ and forms a stop for the vave $g$.

In order to support the pump upon a receptacle, I secure to the pump-cylinder, near its upper end, and to the discharge-pipe the adjustable and removable platform $k$, which consists of the pieces $k'$ and $k''$, secured adjustably together by long bolts $l\ l$ and embracing between them the pump-cylinder and discharge-pipe, as shown, the sides of said pieces being cut out, as shown, to receive the said pipes.

I provide a handle or bail $m$, by means of which the pump may be carried from place to place, and said handle consists of a strap of iron, bent as shown in Fig. 1, its vertical sides being secured to the ends of the platform $k$. These vertical sides are extended below the platform a suitable distance and prevent the pump sliding endwise off the receptacle while it is being operated.

To further strengthen and support the discharge-pipe, I provide a clamp $n$, which consists of a U-shaped bail provided on one of its ends with a downwardly-bent lug, which fits over the side of the handle $m$ when bail $n$ is placed around the discharge-pipe, as shown in Fig. 2. The other end of bail $n$ is screw-threaded and passes under the handle $m$ and is provided with a nut $n'$, by means of which the bail $n$ may be securely clamped to the discharge-pipe, firmly binding the discharge-pipe to the bail $n$.

Having thus fully described my invention, what I claim, and desire to secure by Letters Patent, is—

1. A pump consisting of a pump-cylinder, a discharge-pipe connected to said cylinder, a valve-casing secured to the upper end of the discharge-pipe, an outlet-valve located in said casing, an outwardly-projecting bar secured in said valve-casing, its inner end forming a stop for the outlet-valve, an operating-lever pivoted on its outer end, and a piston working in the cylinder, its rod being connected to the operating-lever, and an inlet pipe and valve connected to the pump-cylinder, substantially as described.

2. A portable pump consisting of a pump-cylinder, a coupling or casing secured to the lower end of said cylinder, an inlet-pipe removably secured to the lower end of said casing, an inlet-valve secured in the said inlet-pipe, said valve consisting of a cup $d$, removably secured in said pipe, said cup being open at its upper end and provided with a circular opening in its bottom, and a ball automatically closing said opening, and a removable pin secured across the top of said cup and held in place when in operation by the wall of the casing, thereby preventing the accidental displacement of said pin, and a piston working in the pump-cylinder and means for operating it, substantially as described.

3. In a portable pump, the combination of a pump-cylinder provided with an inlet pipe and valve, a discharge-pipe connected at its lower end to said cylinder, a removable and adjustable platform secured to said cylinder and discharge-pipe, a transporting bail or handle secured to said platform, the vertical sides of said bail extending a suitable distance below said platform, and a clamp connecting said bail and discharge-pipe, and a piston working in the pump-cylinder and means for operating it, substantially as described.

In testimony whereof I affix my signature in presence of two witnesses.

BENJAMIN WRIGHT.

Witnesses:
CORA CARNCROSS,
THOMAS J. HITTER.